US010408320B2

(12) United States Patent
Hess

(10) Patent No.: US 10,408,320 B2
(45) Date of Patent: Sep. 10, 2019

(54) TORQUE CONVERTER INCLUDING EXTENDED IMPELLER SHELL FOR CONNECTING TO ENGINE DRIVE PLATE

(71) Applicant: Schaeffler Technologies AG & Co. KG, Herzogenaurach (DE)

(72) Inventor: Timothy Hess, Westlake, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 467 days.

(21) Appl. No.: 15/188,804

(22) Filed: Jun. 21, 2016

(65) Prior Publication Data

US 2017/0363191 A1  Dec. 21, 2017

(51) Int. Cl.
*F16H 41/24* (2006.01)
*F16H 45/02* (2006.01)

(52) U.S. Cl.
CPC ............. *F16H 41/24* (2013.01); *F16H 45/02* (2013.01); *F16H 2041/243* (2013.01); *F16H 2045/0205* (2013.01); *F16H 2045/0221* (2013.01); *F16H 2045/0278* (2013.01); *Y10T 29/4933* (2015.01)

(58) Field of Classification Search
CPC .... F16H 41/24; F16H 2041/243; F16H 41/28; F16H 45/02; F16H 2045/0221; F16H 2045/0278; F16D 33/18; Y10T 29/4933
See application file for complete search history.

(56) References Cited

U.S. PATENT DOCUMENTS

| 2,474,298 | A | * | 6/1949 | Zeidler | F16D 33/20 |
| | | | | | 29/436 |
| 3,024,735 | A | * | 3/1962 | Zeidler | F16H 41/24 |
| | | | | | 60/362 |
| 3,873,237 | A | | 3/1975 | Tokunaga | |
| 5,813,505 | A | * | 9/1998 | Olsen et al. | F16H 45/02 |
| | | | | | 192/3.28 |
| 2003/0070294 | A1 | | 4/2003 | Ymanaka et al. | |
| 2013/0086897 | A1 | | 4/2013 | Frait et al. | |
| 2015/0027110 | A1 | | 1/2015 | Lindemann et al. | |

FOREIGN PATENT DOCUMENTS

JP   2002-54715 A  * 2/2002  ....... F16H 2041/243
WO  WO2016094514 A1   6/2016

OTHER PUBLICATIONS

Search Report and Written Opinion from corresponding PCT application.

* cited by examiner

*Primary Examiner* — Richard M Lorence
(74) *Attorney, Agent, or Firm* — Davidson, Davidson & Kappel, LLC

(57) ABSTRACT

A torque converter is provided. The torque converter includes a front cover and an impeller shell including an axially extending section fixed to the front cover. The impeller shell includes a connector on the axially extending section. The connector is configured for connecting to an engine drive plate assembly. A method for forming a torque converter is also provided. The method includes providing connector on an axially extending section of an impeller shell, the connector being configured for connecting to an engine drive plate assembly; and fixing the axially extending section to a front cover.

17 Claims, 2 Drawing Sheets

TORQUE CONVERTER INCLUDING EXTENDED IMPELLER SHELL FOR CONNECTING TO ENGINE DRIVE PLATE

The present disclosure relates generally to torque converters and more specifically to the connection of torque converters to engine drive plates.

BACKGROUND

Conventionally, to satisfy tight overall length tolerances, current designs use a select fit washer design, for example between an inner radially extending surface of the front cover and a radially extending surface of the damper assembly. However, this design is generally expensive and may require extra processing.

SUMMARY OF THE INVENTION

A torque converter is provided. The torque converter includes a front cover and an impeller shell including an axially extending section fixed to the front cover. The impeller shell includes a connector on the axially extending section. The connector is configured for connecting to an engine drive plate assembly.

A method for forming a torque converter is also provided. The method includes providing connector on an axially extending section of an impeller shell, the connector being configured for connecting to an engine drive plate assembly; and fixing the axially extending section to a front cover.

BRIEF DESCRIPTION OF THE DRAWINGS

The present invention is described below by reference to the following drawings, in which.

DETAILED DESCRIPTION

The disclosure provides embodiments of torque converters for accommodating tight axial tolerances without using a costly select fit washer design requiring extra processing, machining the final assembly to correct height, or other methods. The embodiments include an extended impeller rim to create a datum plane for the torque converter by using a single component (impeller) to stack through, thereby adhering to height tolerances. In a first embodiment, the extended rim includes a lug or drive ring attached to an engine drive plate. In a second embodiment, the impeller is connected to an engine drive plate by using a folded portion that is drilled and tapped.

Figure 1:
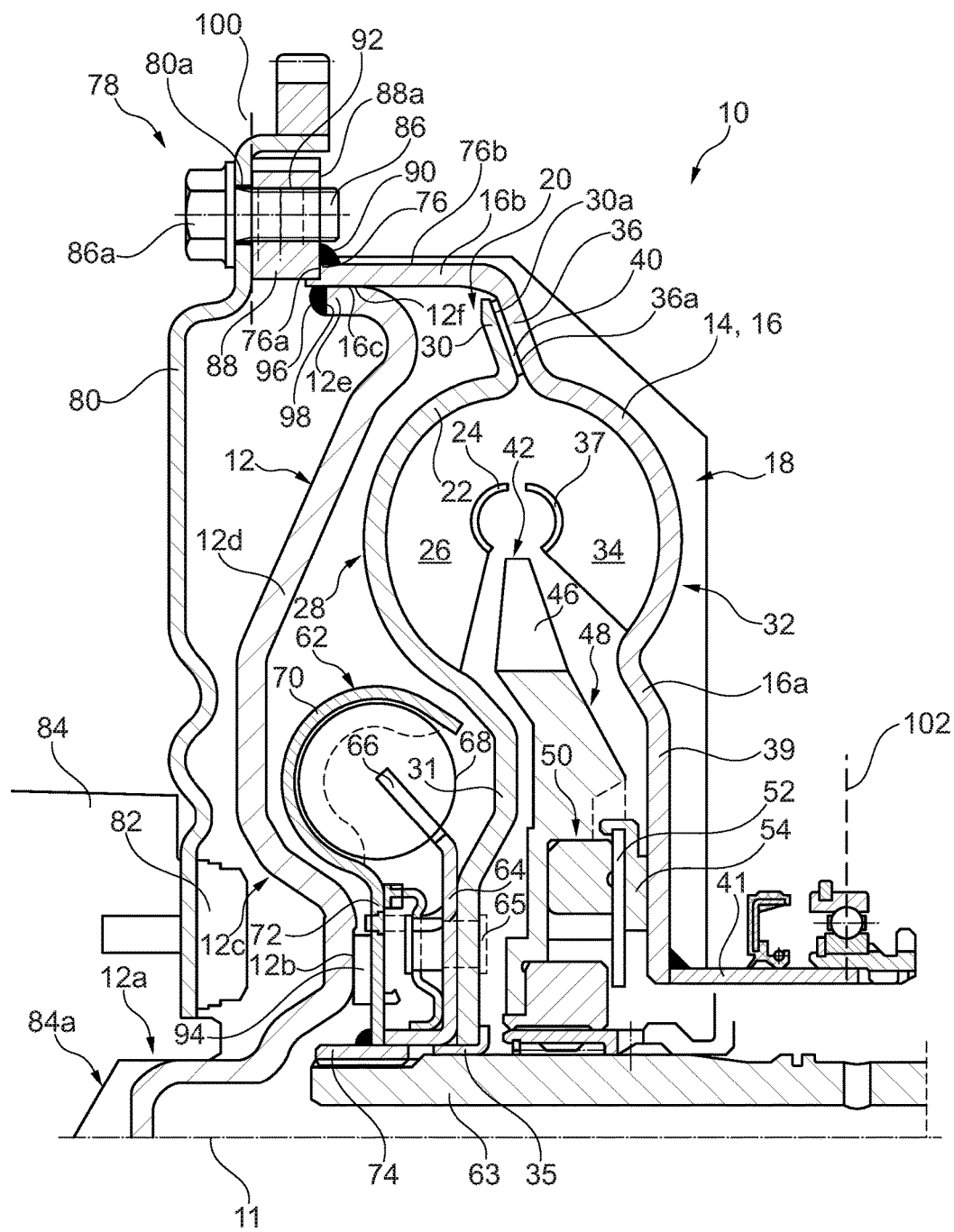
FIG. 1 shows a cross-sectional side view of a torque converter according to an embodiment of the present invention.

FIG. 1 shows a cross-sectional side view of a torque converter 10 in accordance with an embodiment of the present invention. Torque converter 10 is rotatable about a center axis 11 and includes a front cover 12 and a rear cover 14 formed by a shell 16 of an impeller or pump 18. The terms axially, radially and circumferentially as used herein are used with respect to center axis 11.

Torque converter 10 also includes a turbine 20 configured to define a piston that is axially moveable toward and away from impeller shell 16 to engage and disengage an impeller clutch of impeller shell 16 so as to form a lockup clutch. Turbine 20 includes a turbine shell 22 and a core ring 24 supporting a plurality of turbine blades 26 therebetween. Turbine shell 22 includes a rounded blade supporting portion 28, which is shaped as an annular bowl and is the portion of turbine shell 22 that contacts engine side edges of turbine blades 26. Radially outside of blade supporting portion 28, an outer radial extension 30, which forms the piston, radially protrudes outwardly from an outer circumference of blade supporting portion 28 to define an annular protrusion having a flat annular radially extending impeller facing surface 30a and having an outermost circumference that defines an outermost circumference of turbine 20. Accordingly, the piston and turbine shell 22 are formed as a single piece. Radially inside of blade supporting portion 28, turbine shell 22 includes an annular inner radial extension 31 that, at an inner radial end thereof, contacts an outer circumferential surface of a hub 35.

Impeller 18 includes impeller blades 34, which are each fixed at a transmission side thereof to impeller shell 16 and are each fixed to an impeller core ring 37 at an engine side thereof by tabs. Impeller shell 16, at radially extending section 16a thereof, includes a rounded blade supporting portion 32, which is shaped as an annular bowl, for contacting transmission side edges of impeller blades 34. Radially outside of blade supporting portion 32, radially extending section 16a includes a radially extending wall 36, which forms an impeller clutch, radially protrudes outwardly from an outer circumference of rounded blade supporting portion 32 to define an annular wall having a flat annular radially extending turbine facing surface 36a. Accordingly, the impeller clutch and impeller shell 16 are formed as a single piece. Radially inside of blade supporting portion 32, radially extending section 16a includes an annular inner radial extension 39 extending radially inward from blade supporting portion 32. A radially inner end of extension 39 is connected to an impeller hub 41.

A friction material 40 is bonded onto radially extending impeller facing surface 30a of outer radial extension 30 for engaging radially extending wall 36. In other embodiments, instead of or in addition to being bonded to outer radial extension 30, friction material 40 may be bonded to radially extending turbine facing surface 36a of radially extending wall 36. Regardless of whether friction material 40 is bonded to outer radial extension 30 or radially extending wall 36, friction material 40 is provided axially between surfaces 30a, 36a.

Torque converter 10 also includes a stator 42 axially between turbine 20 and impeller 18 to redirect fluid flowing from the turbine blades 26 before the fluid reaches impeller 18 to increase the efficiency of torque converter 10. Stator 42 includes a stator casting including a plurality of blades 46 and a stator body 48. Stator 42 also includes a one-way clutch 50 held within stator body 48 by a centering plate 52. An axial thrust washer 54, which is axially between stator 42 and impeller 18, is fixed to stator 42 at an outer circumference of centering plate 52.

A damper assembly 62 is positioned between front cover 12 and turbine 20 and is configured for transferring torque from turbine 20 to a transmission input shaft 63. Damper assembly 62 includes a drive plate 64 fixed to inner radial extension 31 of turbine 20 by a plurality of circumferentially spaced rivets 65. Drive plate 64 includes a plurality of circumferentially spaced tabs 66 at a radially outer end thereof for rotationally engaging a plurality of circumferentially spaced springs 68. Damper assembly 62 further includes a spring retainer 70 holding springs 68. Spring retainer 70 is formed on a radial outer end of a damper flange 72, which is fixed to a damper hub 74 that includes a splined inner circumferential surface for engaging a splined outer circumferential surface of transmission input shaft 63. During operation of torque converter 10, torque is transferred to from turbine 20 to drive plate 64 via rivets 65. In turn, drive tabs 66 of drive plate 64 rotationally drive springs 68, which rotationally drive flange 72 via spring retainer 70.

Damper assembly 62 is radially compact and fits into a nook formed by the radially inner half of rounded blade supporting portion 28, with the outermost circumference of damper assembly 62, defined by the outermost circumference of spring retainer 70, being radially inside of at least a majority of, if not the entirety of, the radially inner half of rounded blade supporting portion 28. A portion of spring retainer 70 also axially overlaps with rounded blade supporting portion 28.

In accordance with an embodiment of the invention, impeller shell 16 includes an axially extending section 16b, which surrounds turbine 20, including a rim 76, which extends axially further than a conventional impeller rim, for connecting to an engine drive plate assembly 78. In this embodiment, drive plate assembly 78 includes a drive plate 80, a radially inner connector in the form of a plurality of fasteners 82 for connecting drive plate 80 to an engine crankshaft 84 and a radially outer connector in the form of a plurality of fasteners 86, which may be bolts for connecting drive plate 80 to torque converter 10. Impeller shell 16 further includes a connector fixed axially extending section 16, more specifically the connector in this embodiment is in the form of a lug ring 88 fixed at an axial facing radially extending edge 76a of rim 76 by a weld 90 extending from an outer circumferential surface 76b of axially extending section 16b at rim 76 to an axial facing radially extending edge 88a of lug ring 88. Lug ring 88 is provided with a plurality of circumferentially spaced axially extending holes 92, which in a preferred embodiment are threaded, formed therein for receiving fasteners 86, which in a preferred embodiment are threaded bolts, to fix impeller shell 16 to drive plate 80. Fasteners 86 also pass through holes 80a formed in drive plate 80, with drive plate 80 being sandwiched axially between lug ring 88 and heads 86a of fasteners 86.

Front cover 12 includes a pilot 12a for insertion into a blind hole 84a of crankshaft 84 to align front cover 12 with crankshaft 84. Radially outside of pilot 12a, front cover 12 juts axially away from crankshaft 84 toward damper assembly 62, to provide a thrust surface 12b for contacting a thrust washer 94 connected to damper flange 72. Radially outside of thrust surface 12b, front cover 12 juts axially toward drive plate 80 to form contoured section 12c that is contour to a portion of a rounded surface of spring retainer 70. Radially outside of contoured section 12c, front cover 12 further includes a tapered section 12d that gradually tapers away from crankshaft 84 while extending radially outward. At an outermost circumference of front cover 12, radially outside of tapered section 12d, front cover 12 is provided with an axially extending section 12e, which protrudes axially away from a radially outer end of tapered section 12d and axially toward drive plate 80, defining an outer circumferential surface 12f of front cover 12. Outer circumferential surface 12f contacts an inner circumferential surface 16c of axially extending section 16b of impeller shell 16 and axially extending section 12e is welded to an axially extending section 16b. More specifically, a weld 96 is provided at a rim 98 of axially extending section 12e and at inner circumferential surface 16c.

Torque converter 10, specifically the construction of front cover 12 and impeller 16, provide a select fit impeller closure using an extended impeller rim 76 to create a datum plane for which torque converter 10 may be fixed to engine components of different designs. By doing this, the tight overall height tolerance may be easier to achieve since there would only be a single component—the impeller—to stack through for the overall height tolerance, instead of the traditional two components (i.e., cover and impeller). Extended rim 76 is provided with lug ring 88 for attachment to different drive plates. Accordingly, a standard machining process may be used to create a tight tolerance from an engine side plane 100 of lug ring 88 to an end 102 of impeller hub 41. Then, in order to eliminate the variation in play of end 102 from stackup tolerances, the play of end 102 may be measured and used to reach the desired play of end 102 (closing the part solid and then moving back the cover to the desired value). The process may be completed by moving front cover 12 and leaving impeller 18 fixed.

Figure 2:
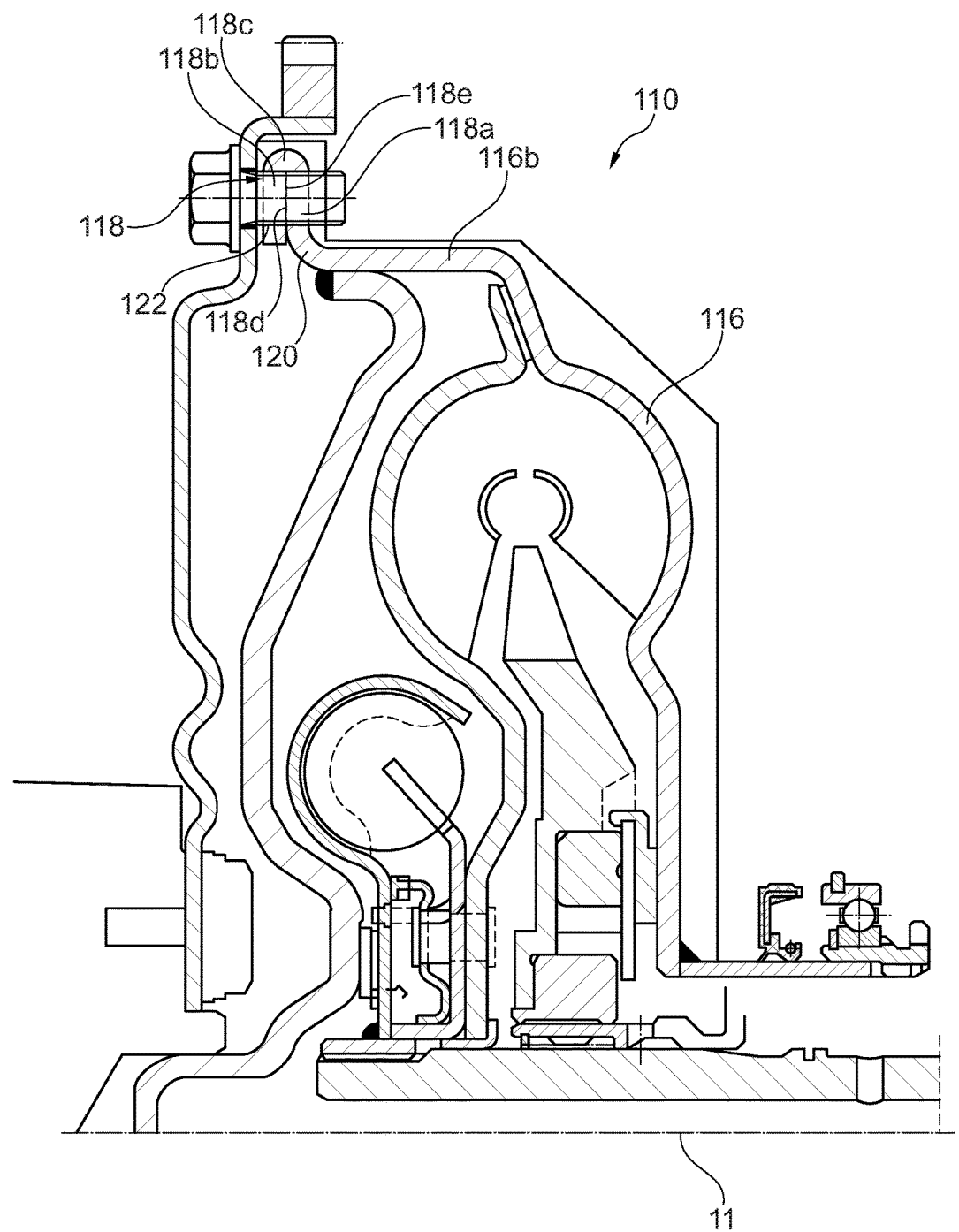
FIG. 2 shows a cross-sectional side view of a torque converter according to another embodiment of the present invention.

FIG. 2 shows a torque converter 110 in accordance with another embodiment of the present invention. Torque converter 110 is configured in the same manner as torque converter 10, except that instead of the connector being provided as a lug ring 88 fixed to axially extending section 16b, an impeller shell 116 of torque converter 110 is extended further in length and includes a folded portion 118 forming the connector. More specifically, an axially extending section 116b of impeller shell 116 merges into a first radially extending section 118a of folded portion at a first bend 120, with radially extending section 118a being approximately perpendicular to axially extending section 116b and center axis 11. First radially extending section 118a then merges with a second radially extending section 118b at a bend 118c, with radially extending sections 118a, 118b being parallel to each other, such that a front facing radially extending surface 118d of first radially extending section 118a contacts a rear facing radially extending surface 118e of second radially extending section 118b. Folded portion 118 is provided with a plurality of circumferentially spaced axially extending holes 122, which pass through both radially extending sections 118a, 118b and in a preferred embodiment are threaded, formed therein for receiving fasteners 86 to fix impeller shell 116 to drive plate 80. Torque converter 110 may be aligned with the engine and transmission components in the same manner as torque converter 110.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A torque converter comprising:
  a front cover including an axially extending section; and
  an impeller shell including an axially extending section fixed to the front cover, the impeller shell including a connector on the axially extending section, the connector being configured for connecting to an engine drive plate assembly, the axially extending section of the front cover including a rim configured for facing toward the engine drive plate assembly,
    wherein the axially extending section of the front cover is welded onto an inner circumferential surface of the axially extending section of the impeller shell, wherein the front cover includes a tapered section tapering axially away from the engine drive plate assembly, the axially extending section of the front cover extending axially away from an outer end of the tapered section toward the engine drive plate assembly.

2. The torque converter as recited in claim 1 wherein the connector is configured for contacting an engine drive plate of the engine drive plate assembly.

3. The torque converter as recited in claim 1 wherein the connector is fixed to a rim of the axially extending section of the impeller shell.

4. The torque converter as recited in claim 3 wherein the connector is a lug ring including a plurality of holes each configured for receiving one of a plurality of fasteners of the engine drive plate assembly.

5. The torque converter as recited in claim 1 wherein the connector is fixed to the axially extending section of the impeller shell by a weld provided on an outer circumferential surface of the axially extending section of the impeller shell.

6. The torque converter as recited in claim 1 wherein the connector is formed integrally with the axially extending section of the impeller shell.

7. The torque converter as recited in claim 6 wherein the connector is a folded portion extending radially away from the axially extending section of the impeller shell.

8. The torque converter as recited in claim 7 wherein the folded portion includes a first radially extending section extending radially outward from the axially extending section of the impeller shell and a second radially extending section extending radially inward from a radially outer end of the first radially extending section, the folded portion including a plurality of holes passing axially through first and second radially extending sections, each of the holes being configured for receiving one of a plurality of fasteners of the engine drive plate assembly.

9. The torque converter as recited in claim 1 further comprising a turbine configured to define a piston that is axially moveable toward and away from the impeller shell to engage and disengage an impeller clutch of the impeller shell so as to form a lockup clutch.

10. The torque converter as recited in claim 9 further comprising a damper assembly connected to the turbine, the damper assembly being fit into a nook formed by a radially inner half of a rounded blade supporting portion of the turbine.

11. A method for forming a torque converter comprising:
providing a connector on an axially extending section of an impeller shell, the connector being configured for connecting to an engine drive plate assembly; and
welding an inner circumferential surface of the axially extending section of the impeller shell to an axially extending section of a front cover, the front cover including a tapered section tapering axially away from the engine drive plate assembly, the axially extending section of the front cover extending axially away from an outer end of the tapered section toward the engine drive plate assembly.

12. The method as recited in claim 11 wherein the providing the connector on the axially extending section of the impeller shell includes fixing the connector to a rim of the axially extending section of the impeller shell.

13. The method as recited in claim 12 wherein the connector is a lug ring including a plurality of holes each configured for receiving one of a plurality of fasteners of the engine drive plate assembly.

14. The method as recited in claim 11 wherein the connector is formed integrally with the axially extending section of the impeller shell.

15. The method as recited in claim 14 wherein the providing the connector on the axially extending section of the impeller shell includes folding the impeller shell to form the connector, the connector being a folded portion extending radially away from the axially extending section of the impeller shell.

16. The torque converter as recited in claim 1 wherein the front cover is welded to the impeller shell by a weld provided at the rim and at the inner circumferential surface of the axially extending section of the impeller shell.

17. A torque converter comprising:
a front cover; and
an impeller shell including an axially extending section fixed to the front cover, the impeller shell including a connector on the axially extending section, the connector being configured for connecting to an engine drive plate assembly,
wherein the connector is formed integrally with the axially extending section,
wherein the connector is a folded portion extending radially away from the axially extending section, and
wherein the folded portion includes a first radially extending section extending radially outward from the axially extending section and a second radially extending section extending radially inward from a radially outer end of the first radially extending section, the folded portion including a plurality of holes passing axially through first and second radially extending section, each of the holes being configured for receiving one of a plurality of fasteners of the engine drive plate assembly.

* * * * *